US012455367B2

(12) United States Patent
Cho et al.

(10) Patent No.: US 12,455,367 B2
(45) Date of Patent: Oct. 28, 2025

(54) EGO MOTION ESTIMATION BASED ON CONSECUTIVE TIME FRAMES INPUT TO MACHINE LEARNING MODEL

(71) Applicant: Samsung Electronics Co., Ltd., Suwon-si (KR)

(72) Inventors: Hyunwoong Cho, Seoul (KR); Sungdo Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1447 days.

(21) Appl. No.: 16/351,689

(22) Filed: Mar. 13, 2019

(65) Prior Publication Data
US 2020/0003886 A1    Jan. 2, 2020

(30) Foreign Application Priority Data
Jun. 27, 2018  (KR) .................. 10-2018-0073709

(51) Int. Cl.
| | | |
|---|---|---|
| *G01S 13/58* | (2006.01) | |
| *G01S 13/60* | (2006.01) | |
| *G01S 13/62* | (2006.01) | |
| *G06N 3/02* | (2006.01) | |
| *G06N 3/045* | (2023.01) | |
| *G06N 3/084* | (2023.01) | |

(Continued)

(52) U.S. Cl.
CPC ............ *G01S 13/588* (2013.01); *G01S 13/58* (2013.01); *G01S 13/589* (2013.01); *G01S 13/60* (2013.01); *G01S 13/62* (2013.01); *G06N 3/02* (2013.01); *G06N 3/045* (2023.01); *G06N 3/084* (2013.01); *G06N 20/00* (2019.01); *G06N 20/20* (2019.01)

(58) Field of Classification Search
CPC ........ G06N 3/02; G06N 3/0454; G06N 3/084; G06N 20/00; G06N 20/20; G06N 3/045; G06N 3/08; G01S 13/589; G01S 13/60; G01S 13/588; G01S 13/58; G01S 13/62; G01S 13/931; G01S 7/417; G01S 13/50; G01S 7/415; G06V 40/20; G06V 10/46
See application file for complete search history.

(56) References Cited

U.S. PATENT DOCUMENTS

| | | |
|---|---|---|
| 6,366,236 B1 | 4/2002 | Farmer et al. |
| 8,026,840 B2 | 9/2011 | Dwelly et al. |

(Continued)

FOREIGN PATENT DOCUMENTS

| | | |
|---|---|---|
| CN | 106919903 A | 7/2017 |
| CN | 107016357 A | 8/2017 |

(Continued)

OTHER PUBLICATIONS

Du et. al., "Ego-motion Classification for Driving Vehicle", 2017, IEEE Third International Conference on Multimedia Big Data (BigMM), vol. 3 (2017), pp. 276-279 (Year: 2017).*

(Continued)

*Primary Examiner* — Leonard A Sieger
(74) *Attorney, Agent, or Firm* — NSIP Law

(57) ABSTRACT

Disclosed is an ego motion estimation method and apparatus. The ego motion estimation apparatus may generate input data based on radar sensing data collected by one or more radar sensors for each of a plurality of time frames, and estimate ego motion information based on the input data using a motion recognition model.

25 Claims, 15 Drawing Sheets

(51) Int. Cl.
  *G06N 20/00*  (2019.01)
  *G06N 20/20*  (2019.01)

(56) References Cited

U.S. PATENT DOCUMENTS

| | | |
|---|---|---|
| 9,600,765 B1 | 3/2017 | Pedersen et al. |
| 9,761,131 B2 | 9/2017 | Robinson |
| 2011/0074620 A1 | 3/2011 | Wintermantel |
| 2016/0282458 A1 | 9/2016 | Nugraha et al. |
| 2017/0083772 A1* | 3/2017 | Kim .................. B60C 9/00 |
| 2017/0259801 A1 | 9/2017 | Abou-Nasr et al. |
| 2017/0294121 A1 | 10/2017 | Jain et al. |
| 2018/0018558 A1 | 1/2018 | Lee et al. |
| 2018/0024569 A1 | 1/2018 | Branson |
| 2018/0038694 A1 | 2/2018 | Bruemmer et al. |
| 2018/0060725 A1 | 3/2018 | Groh et al. |
| 2018/0082137 A1 | 3/2018 | Melvin et al. |
| 2019/0065910 A1* | 2/2019 | Wang .................. G06T 11/60 |
| 2019/0079536 A1* | 3/2019 | Zhu .................... G06T 7/269 |
| 2019/0332939 A1* | 10/2019 | Alletto .............. H04N 19/513 |
| 2020/0092565 A1* | 3/2020 | Watters ............. H04N 19/174 |

FOREIGN PATENT DOCUMENTS

| | | |
|---|---|---|
| JP | 2011-526370 A | 10/2011 |
| JP | 2016-188859 A | 11/2016 |
| KR | 10-1234192 B1 | 2/2013 |
| KR | 10-1460591 B1 | 11/2014 |
| KR | 10-2018-0055629 A | 5/2018 |
| WO | WO 2018/088170 A1 | 5/2018 |
| WO | WO 2018/089210 A1 | 5/2018 |

OTHER PUBLICATIONS

Cen et. al., "Precise Ego-Motion Estimation with Millimeter-Wave Radar Under Diverse and Challenging Conditions," May 25, 2018, IEEE International Conference on Robotics and Automation (ICRA), vol. 2018, pp. 6045-6052 (Year: 2018).*
Karpathy et. al., "Large-scale Video Classification with Convolutional Neural Networks", 2014, Proceedings of the IEEE Conference on Computer Vision and Pattern Recognition (CVPR), vol. 2014, pp. 1-8 (Year: 2014).*
Kellner et. al., "Joint spatial- and Doppler-based ego-motion estimation for automotive radars", IEEE Intelligent Vehicles Symposium (IV), vol. 2015, pp. 839-844 (Year: 2015).*
Barjenbruch et. al., "Instantaneous ego-motion estimation using multiple Doppler radars", 2014, IEEE International Conference on Robotics and Automation (ICRA), vol. 2014, pp. 1592-1597 (Year: 2014).*
Bin et. al., "Describing Video With Attention-Based Bidirectional LSTM", Online May 25, 2018, https://ieeexplore.ieee.org/abstract/document/8365878, pp. 2631-2641 (Year: 2018).*
Konda et. al., "Learning Visual Odometry with a Convolutional Network", 2015, VISAPP, vol. 2015, pp. 1-5 (Year: 2015).*
Qiao et. al., "Learning the Frame-2-Frame Ego-Motion for Visual Odometry with Convolutional Neural Network", 2017, CCCV, vol. 2017, pp. 500-511 (Year: 2017).*
Costante et. al., "Exploring Representation Learning With CNNs for Frame-to-Frame Ego-Motion Estimation", 2016, IEEE Robotics and Automation Letters, vol. 1 No. 1, pp. 18-25 (Year: 2016).*
Sudharakan et al., "Convolutional Long Short-Term Memory Networks for Recognizing First Person Interactions", Jan. 22, 2018, IEEE International Conference on Computer Vision Workshops (ICCVW), vol. 2017, pp. 2339-2346 (Year: 2017).*
Qiao et al., "Learning the frame-2-frame ego-motion for visual odometry with convolutional neural network", 2017, Computer Vision Second CCF Chinese Conference, CCCV 2017, pp. 500-511 (Year: 2017).*
Muller et al., "Flowdometry: An Optical Flow and Deep Learning Based Approach to Visual Odometry", 2017, IEEE Winter Conference on Applications of Computer Vision, vol. 2017, pp. 624-631 (Year: 2017).*
Zhang et al., "Latern: Dynamic Continuous Hand Gesture Recognition Using FMCW Radar Sensor", Apr. 15, 2018, IEEE Sensors Journal, vol. 18 No. 8, pp. 3278-3289 (Year: 2018).*
Barjenbruch et al., "Joint spatial- and Doppler-based ego-motion estimation for automotive radars," 2015, 2015 IEEE Intelligent Vehicles Symposium (IV), vol. 2015, pp. 839-844 (Year: 2015).*
Cen et al., "Precise Ego-Motion Estimation with Millimeter-Wave Radar Under Diverse and Challenging Conditions", May 25, 2018, 2018 IEEE International Conference on Robotics and Automation (ICRA), vol. 2018, pp. 6045-6052 (Year: 2018).*
Bin et al., "Describing Video With Attention-Based Bidirectional LSTM", published online May 25, 2018, retrieved from https://ieeexplore.ieee.org/abstract/document/8365878 (Year: 2018).*
Qiao et al., "Learning the Frame-2-Frame Ego-Motion for Visual Odometry with Convolutional Neural Network", 2017, Chinese Conference on Computer Vision, vol. 2017, pp. 500-511 (Year: 2017).*
Ji et al., "3D Convolutional Neural Networks for Human Action Recognition", 2013, IEEE Transactions on Pattern Analysis and Machine Intelligence, vol. 35 No. 1 (Jan. 2013), pp. 221-231 (Year: 2013).*
Weber et al., "Learning temporal features with CNNs for monocular visual ego motion estimation", 2017, 2017 IEEE 20th International Conference on Intelligent Transportation Systems (ITSC), vol. 20 (2017), pp. 287-292 (Year: 2017).*
Vaquero et al., "Deep Lidar CNN to Understand the Dynamics of Moving Vehicles", May 25, 2018, 2018 IEEE International Conference on Robotics and Automation (ICRA), vol. 2018, pp. 4504-4509 (Year: 2018).*
Fairchild et al., "Classification of human motions using empirical mode decomposition of human micro-Doppler signatures", 2014, IET Radar, Sonar & Navigation vol. 8.5, pp. 425-434 (Year: 2014).*
Erol et al., "Simulation of human micro-Doppler signatures with Kinect sensor", 2014, IEEE Radar Conference, vol. 2014, pp. 863-868 (Year: 2014).*
Sudharakan et al., "Convolutional Long Short-Term Memory Networks for Recognizing First Person Interactions", Jan. 22, 2018, IEEE International Conference on Computer Vision Workshops (ICCVW), vol. 2017, pp. 2339-2346 (Year: 2018).*
Kellner, D et al., "Instantaneous Ego-Motion Estimation using Multiple Doppler Radars", *IEEE Conference on Robotics & Automation (ICRA)*, 2014, pp. 1592-1597 (6 pages in English).
Barjenbruch, M et al., "Joint-Spatial- and Doppler-Based Ego-Motion Estimation for Automotive Radars", *IEEE Intelligent Vehicles Symposium (IV)*, 2015, pp. 839-844 (6 pages in English).
Kim, B et al., "Probabilistic Vehicle Trajectory Prediction over Occupancy Grid Map via Recurrent Neural Network", arXiv:1704.07049v1, pp. 1-6 (6 pages in English).
Cen, S et al., "Precise Ego-Motion Estimation with Millimeter-Wave Radar under Diverse and Challenging Conditions", *IEEE International Conference on Robotics and Automation (ICRA)*, 2018, pp. 6045-6052 (8 pages in English).
Extended European Search Report issued on Nov. 15, 2019 in corresponding European Patent Application No. 19170539.1 (10 pages in English).
Wang et al., "Interacting with Soli: Exploring Fine-Grained Dynamic Gesture Recognition in the Radio-Frequency Spectrum", *Proceedings of the 29th Annual Symposium on User Interface Software and Technology*, Oct. 2016, pp. 851-860 (10 pages in English).
Lupfer, Stefanie, et al. "Increasing FastSLAM Accuracy for Radar Data by Integrating the Doppler Information." 2017 IEEE Mtt-S International Conference on Microwaves for Intelligent Mobility (ICMIM). IEEE, 2017, (4 pages in English).
Yamamuro, Sae, et al. "Summary and Classification of Time Series Data Using Deep Learning" Graduate School of Natural Sciences, Kumamoto University, DEIM Forum 2018 C3-3, (1 page in English, 8 pages in Japanese).
Japanese Office Action issued on Apr. 11, 2023, in counterpart Japanese Patent Application No. 2019-114795 (3 pages in English, 7 pages in Japanese).
Korean Office Action issued on Sep. 25, 2023, in counterpart Korean Patent Application No. 10-2018-0073709 (5 pages in English, 8 pages in Korean).

(56) References Cited

OTHER PUBLICATIONS

Chinese Office Action issued on Jul. 9, 2024, in counterpart Chinese Patent Application No. 201910216093.4 (15 pages in English, 11 pages in Chinese).
Chinese Office Action issued on Oct. 16, 2024 in corresponding China Patent Application No. 201910216093.4 (5 pages in English, 6 pages in Chinese).
Chinese Office Action issued on Jan. 20, 2024, in counterpart Chinese Patent Application No. 201910216093.4 (12 pages in English, 12 pages in Chinese).

* cited by examiner

EGO MOTION ESTIMATION BASED ON CONSECUTIVE TIME FRAMES INPUT TO MACHINE LEARNING MODEL

CROSS-REFERENCE TO RELATED APPLICATIONS

This application claims the benefit under 35 USC § 119(a) of Korean Patent Application No. 10-2018-0073709 filed on Jun. 27, 2018 in the Korean Intellectual Property Office, the entire disclosure of which is incorporated herein by reference for all purposes.

BACKGROUND

1. Field

The following description relates to apparatuses and methods with ego motion estimation.

2. Description of Related Art

Recently, a technological automation of pattern recognition, for example, has been implemented through processor implemented neural network models, as specialized computational architectures, that after substantial training may provide computationally intuitive mappings between input patterns and output patterns. The trained capability of generating such mappings may be referred to as a learning capability of the neural network. Further, because of the specialized training, such specially trained neural network may thereby have a generalization capability of generating a relatively accurate output with respect to an input pattern that the neural network may not have been trained for, for example.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented ego motion estimation method includes generating input data based on radar sensing data collected by one or more radar sensors for each of a plurality of time frames, and estimating ego motion information based on the input data using a motion recognition model.

The estimating of the ego motion information may include extracting feature data from the input data using a first model of the motion recognition model, and determining the ego motion information based on the feature data using a second model of the motion recognition model.

The estimating of the ego motion information may include determining either one or both of a position and a pose of an apparatus as the ego motion information.

The estimating of the ego motion information may include inputting, as the input data, radar sensing data corresponding to at least two time frames into a layer of the motion recognition model corresponding to one of the at least two time frames.

The estimating of the ego motion information may include extracting current feature data from input data of a current frame and a previous frame of the time frames, using a first model, and determining current ego motion information based on the current feature data, using a second model.

The estimating of the ego motion information may include extracting subsequent feature data from input data of a subsequent frame of the time frames and the current frame, using the first model, and determining subsequent ego motion information based on the subsequent feature data, using the second model.

The extracting of the subsequent feature data may include excluding the input data of the previous frame from the extracting of the subsequent feature data.

The first model may include a convolutional neural network and the second model may include a recurrent neural network.

The motion recognition model may include a first model including layers, where each of the layers may correspond to a respective one of the plurality of time frames, and a second model connected to the layers of the first model, where the estimating of the ego motion information may include extracting, using a layer of the layers in the first model corresponding to a time frame of the plurality of time frames, feature data from input data of the time frame, determining ego motion information of the time frame based on the extracted feature data using on the second model.

The estimating of the ego motion information may include extracting current feature data from input data corresponding to a current frame using a first model, loading previous feature data corresponding to a previous frame from a memory, determining the ego motion information based on the previous feature data and the current feature data using a second model.

The method may further include storing, in a memory, feature data determined for a current frame using a first model included in the motion recognition model.

The generating of the input data may include detecting a radar signal using one or more radar sensors arranged along an outer face of an apparatus, generating the radar sensing data by preprocessing the detected radar signal, and generating the input data based on the preprocessed radar signal.

The generating of the input data may include selecting two or more items of the radar sensing data corresponding to time frames of the time frames differing from each other by a preset time interval, and generating the input data based on the selected items of radar sensor data.

The generating of the input data may include excluding radar sensing data corresponding to a first frame of the plurality of time frames stacked in the input data, in response to radar sensing data corresponding to a subsequent frame being received.

The generating of the input data may include generating radar sensing data indicating an angle and a distance from a point detected by the one or more radar sensors for each quantized velocity from a radar signal.

The generating of the input data may include generating input data indicating a horizontal angle and a distance from a point detected by the one or more radar sensors for each quantized elevation angle from the radar sensing data.

The generating of the input data may include classifying the radar sensing data into static data of a static point detected by the one or more radar sensors and dynamic data of a dynamic point detected by the one or more radar sensors, generating static input data indicating a horizontal angle and a distance from the static point for each quantized elevation angle based on the static data, and generating dynamic input data indicating a horizontal angle and a distance from the dynamic point for each quantized elevation angle based on the dynamic data.

The motion recognition model may include a convolutional neural network and a recurrent neural network (RNN).

The RNN may be a bi-directional neural network.

The estimating of the ego motion information may include determining, in response to a plurality of items of radar sensing data corresponding to a plurality of time frames being stacked in the input data, ego motion information for each of the plurality of time frames.

The method may further include detecting an object in a vicinity of an apparatus based on the estimated ego motion information.

The method may further include generating reference input data for a plurality of training time frames based on reference radar sensing data and reference output data corresponding to the reference input data, generating the motion recognition model by training parameters of a model to output the reference output data based on the reference input data.

In one general aspect, a non-transitory computer-readable storage medium may be provided storing instructions that, when executed by one or more processors, cause the one or more processors to perform one or more or all operations described herein.

In one general aspect, a processor-implemented ego motion estimation includes generating reference input data for a plurality of time frames based on reference radar sensing data and reference output data corresponding to the reference input data, and generating a motion recognition model by training parameters of a model to output the reference output data based on the reference input data.

In one general aspect, an ego motion estimation apparatus may include one or more radar sensors configured to generate radar sensing data, and one or more processors configured to generate input data based on the radar sensing data for each of a plurality of time frames of the radar sensing data, and estimate ego motion information based on the input data using a motion recognition model.

In one general aspect, a processor-implemented ego motion estimation method includes stacking radar sensing data of consecutives time frames to exclude radar sensing data of a first time frame among the consecutive time frames, and determining ego motion information based on the stacked radar sensing data.

The method may further include updating the stacked radar sensing data to include radar sensing data of a time frame subsequent to the consecutive time frames and to exclude a second time frame among the consecutive time frames, and determining subsequent ego motion information based on the updated stacked radar sensing data.

Other features and aspects will be apparent from the following detailed description, the drawings, and the claims.

Figure 1:
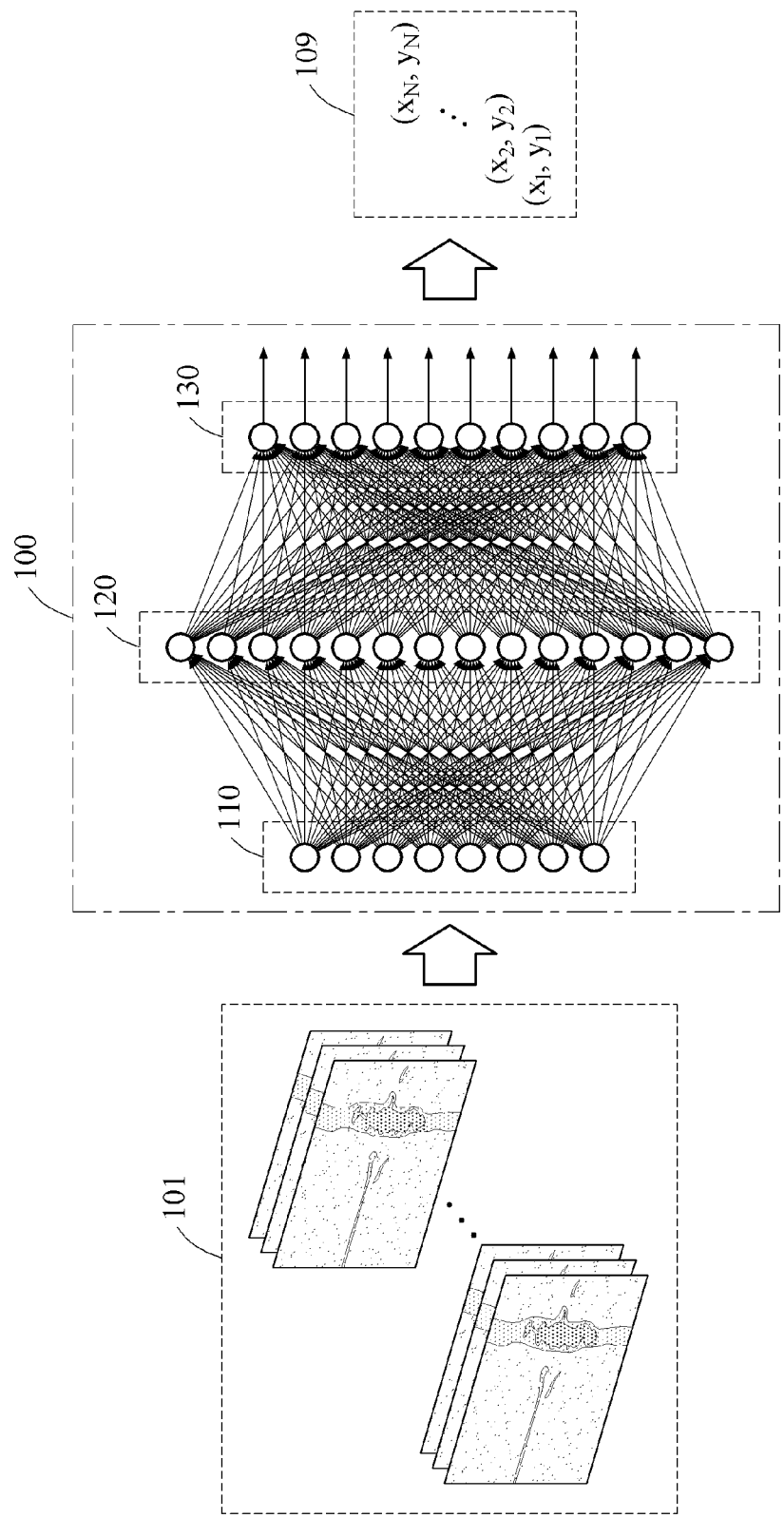
FIG. 1 illustrates an example of estimating ego motion information from radar sensing data based on a motion recognition model.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and in the context of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

FIG. 1 illustrates an example of estimating ego motion information from radar sensing data based on a motion recognition model.

A motion recognition model may be a model configured to output ego motion information 109 from radar sensing data 101. The motion recognition model may have a machine learning structure but is not be limited thereto. An ego motion estimation apparatus may generate the ego motion information 109 for each of a plurality of time frames at once from input data, in which the radar sensing data 101 for the plurality of time frames is stacked, using the motion recognition model.

The radar sensing data 101 may be data sensed by a radar sensor, e.g., a radar sensor of the ego motion estimation apparatus. For example, the radar sensor receives a signal obtained by reflecting a signal emitted from the radar sensor to a target point and generates the radar sensing data 101 using the received signal. The radar sensing data 101 may include a distance from the radar sensor to the target point. As illustrated in FIG. 1, the radar sensing data 101 may be input to the motion recognition model in a stacked form. The use of the term 'may' herein with respect to an example or embodiment, e.g., as to what an example or embodiment may include or implement, means that at least one example or embodiment exists where such a feature is included or implemented while all examples and embodiments are not limited thereto.

The ego motion information 109 is information associated with a motion of an apparatus and may include, for example, a relative movement, coordinates, and a pose of the apparatus. In FIG. 1, the ego motion information 109 indicates coordinates $(x_i, y_i)$, such as of the ego motion estimation apparatus for each of N time frames, N being an integer greater than or equal to 1 and i being an integer between 1 and N. The time frame may be a unit by which a time is segmented. The ego motion information 109 is not limited to the aforementioned example and thus, may include various values such as three-dimensional (3D) coordinates, for example, x, y, and z coordinates, respectively corresponding to a range, an azimuth, and elevation coordinates, two dimensional (2D) coordinates, for example, x and y coordinates, respectively corresponding to a distance, and angle coordinates, eastward, northward, height, roll, yaw, pitch, velocity, and the like, as non-limiting example.

The motion recognition model may be or include a neural network 100 and may be configured for the implementation of the motion recognition model in a method of performing ego motion recognition estimation or an ego motion recognition estimation apparatus. For example, the herein referenced methods of performing ego motion recognition estimation or ego motion recognition estimation apparatuses may correspond to the method of performing ego motion recognition estimation or the ego motion recognition estimation apparatus that implements the motion recognition model for such aforementioned ego motion information 109, and/or the method of performing ego motion recognition estimation or ego motion recognition estimation apparatus that performs the training of the motion recognition model. Hereinafter, though the referenced method of performing ego motion recognition estimation and ego motion recognition estimation apparatus terms are meant to refer to such various examples, for simplicity of explanation such training aspects will be explained separate from the implementation, e.g., as a method of training the neural network 100 and an apparatus for training the neural network 100, hereinafter, referred to as "model training apparatus."

Prior to further describing such ego motion recognition, an example structure of the neural network 100 will be described as follows.

The neural network 100 may include a plurality of layers, each including a plurality of nodes. Also, the neural network 100 includes connection weights that connect the plurality of nodes included in the plurality of layers to a node included in another layer. The model training apparatus may acquire a preliminary or initialized neural network, e.g., through an initialization operation or from an internal database stored in a memory, or through receipt of the preliminary or initialized neural network from an external server through communication hardware.

The preliminary or initialized neural network may be, for example, configured for training a recognition model that would thereafter perform a desired operation using numerous nodes connected through weighted connection lines, for example, edges. The training of the preliminary or initialized neural network may then be stored in a memory as the neural network 100. The training of the preliminary or initialized neural network, as well as the implementing of the neural network 100, may both or respectively be implemented through hardware or a combination of hardware and instructions stored in memory, for example. The neural network 100 may also be referred to as an artificial neural network.

Thus, the neural network 100 may include a plurality of nodes separated for each layer. The nodes are mutually connected through an edge having respective connection weights with respect to activations of the nodes. Through the training, such connection weights may be iteratively adjusted until the trained neural network reaches a minimum threshold accuracy and/or maximum threshold in-accuracy, as non-limiting examples, and then the trained values of the connection weights stored as respective predetermined values of the edge, which may also be referred to as connection strengths of the example edge.

As noted, the neural network 100 may include a plurality of layers. The neural network 100 includes, for example, an input layer 110, a hidden layer 120, and an output layer 130. Nodes of the input layer 110 receive an input for performing recognition and transfer the input to nodes of the hidden layer 120 through respective weighted connections. Nodes of the output layer 130 generate an output of the neural network 100 based on respective weighted activations received from nodes of the hidden layer 120, noting that there may be multiple hidden layers 120 each similarly having weighted edges. As another example, during training a corresponding input layer receives training input, and through iterative adjustments of such respective weighted edges between all of the layers, generates respective outputs that can be considered for performing the iterative adjustments, such as through a loss back propagation.

Hereinafter, a node included in the input layer 110 may be referred to as an input node, a node included in the hidden layer 120 may be referred to as a hidden node, and a node included in the output layer 130 may be referred to as an output node.

With plural hidden layers 120, the neural network 100 may be referred to as a deep neural network. Training of the deep neural network may be referred to as deep learning. For example, in accordance with such explanations, when the hidden layer 120 includes a first hidden layer, a second hidden layer, and a third hidden layer, outputs of hidden nodes included in the first hidden layer are connected to hidden nodes included in the second hidden nodes, and outputs of the hidden nodes included in the second hidden layer are connected to hidden nodes included in the third hidden layer.

Also, the ego motion estimation apparatus generates respective outputs of hidden nodes included in a hidden layer based on respective activation function and values obtained by applying corresponding connection weights to the activation outputs of a previous layer hidden nodes. For example, an example where the processor of the ego motion estimation apparatus is a neuromorphic processor, the processor may fire an output from a current hidden node to a subsequent hidden node when a result of the activation of the current hidden node is greater than a threshold of the current hidden node. In this example, the current hidden node remains in an inactivated state, instead of transmitting a signal to the subsequent node, until the current hidden node reaches a threshold activation strength, e.g., using input vectors. Training of the preliminary or initialized neural network by the model training apparatus may similarly implement such a neuromorphic processor, or other processor, as discussed above. Hereinafter, though the neural network 100 may be a trained result of the model training apparatus, and thus different from the preliminary or initialized neural network and the intermediary neural networks represented by the iterative weighting adjustments, hereinafter such different neural networks will be merely referred to as the neural network 100, e.g., as the neural network 100 that is implemented by the ego motion recognition estimation apparatus and as the neural network 100 that is trained by the model training apparatus, i.e., in a training of the neural network 100.

Thus, the model training apparatus may train the neural network 100 through supervised learning. The model training apparatus may be implemented by hardware circuitry or a combination of hardware circuitry and executed instructions from a memory of the model training apparatus. The supervised learning is a scheme of inputting a training input of training data and a training output corresponding to the training input to the neural network 100 and updating/adjusting connection weights of edges such that output data corresponding to the training output of the training data is output. Although FIG. 1 illustrates a neural network having a node structure, embodiments are not limited to the node structure. Various data structures may be used to store the neural network in a memory storage.

Training data is data used for training and may include a pair of a training input and a training output corresponding to the training input. The training input is, for example, sample radar data collected in advance. The training output is a given value to be output for a predetermined training input and, for example, in an example where the ego motion information 109 is referencing sample radar data, e.g., rather than real world or current radar data considered in the implementation of the neural network 100.

The model training apparatus may use a gradient descent scheme based on output values of nodes included in a neural network and a loss back-propagated to the neural network, to determine parameters of the nodes. For example, the model training apparatus updates/adjusts connection weights, e.g., as examples of such parameters, between the nodes through loss back-propagation learning. The loss back-propagation learning is a method of estimating a loss by performing forward computation on given training data, propagating the estimated loss in a reverse direction from the output layer 130 toward the hidden layer 120 and then the input layer 110, and updating the connection weights to reduce the loss. Thus, a processing, implementation, or inference of the neural network 100, as the trained motion recognition model, is performed in a direction from the input layer 110 toward the hidden layer 120 and the output layer 130, where a result of the motion recognition estimation is indicated. Rather, in the loss back-propagation training, while such forward operations may be performed to determine a loss, the respective updates/adjusting of the connection weights are performed in the direction from the output layer 130, toward the hidden layer 120, and the input layer 110. One or more processes may use a buffer memory that stores a layer or a series of computation data to process the neural network in either or both directions.

The model training apparatus may define an objective function for measuring a degree to which currently set connection weights are close to optimum, continuously change the connection weights based on a result of the objective function, and repetitively perform the training. The objective function may be, for example, a loss function for calculating a loss between an actual output value output by the neural network 100 based on the training input of the training data and a desired expected value to be output, for example, the training output. The model training apparatus updates the connection weights to reduce a value of the loss function.

A configuration of the motion recognition model will be described as follows.

Figure 2:
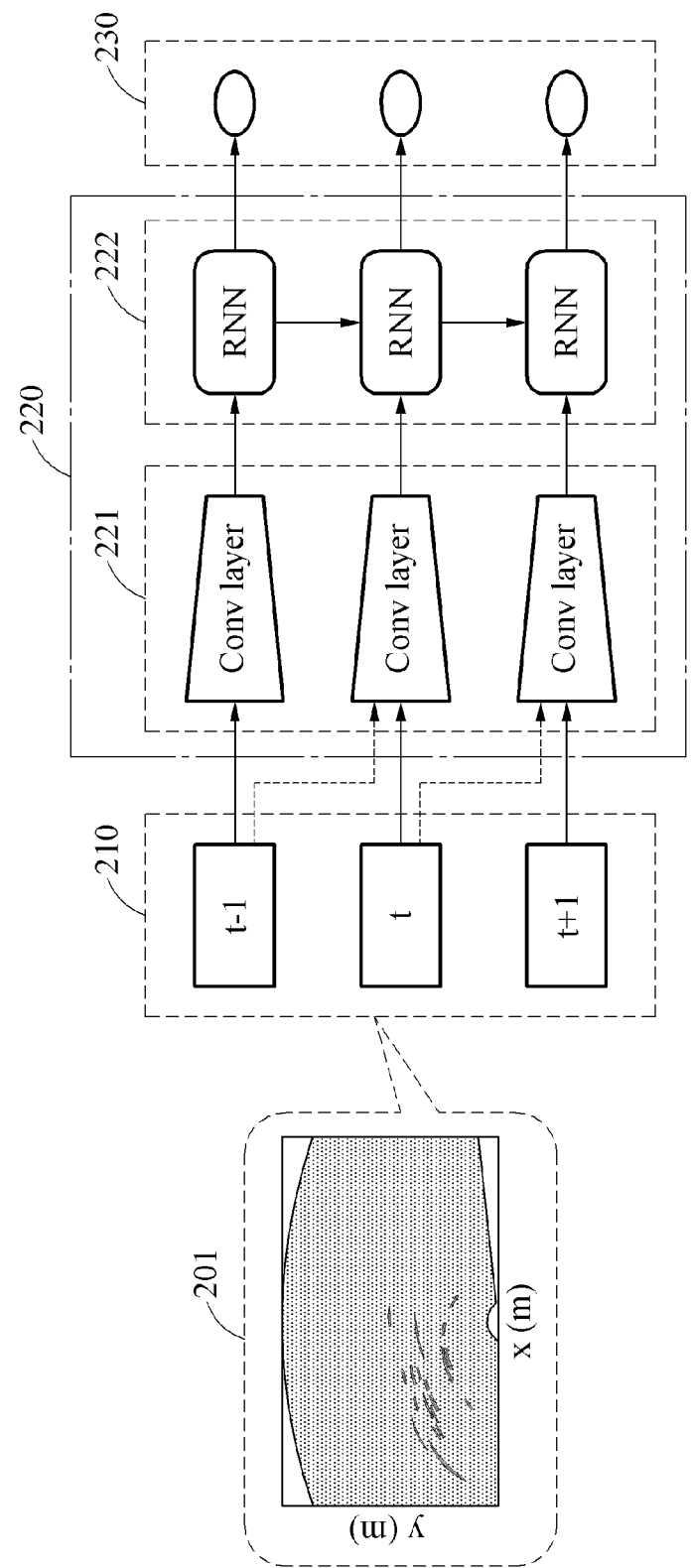
FIG. 2 illustrates an example of a structure of a motion recognition model.

FIG. 2 illustrates an example of a structure of a motion recognition model.

For example, a motion recognition model 220 may include a first model 221 and a second model 222.

The first model 221 may be a model for extracting feature data from predetermined data. An ego motion estimation apparatus extracts feature data from input data 210 using the first model 221. The first model 221 may include a convolutional neural network (CNN). The first model 221 may include a layer corresponding to each of a plurality of time frames. As illustrated in FIG. 2, the first model 221 may include a convolution layer corresponding to each time frame of the input data 210.

The second model 222 may be a model for generating ego motion information 230 using the feature data generated by the first model 221. The ego motion estimation apparatus may calculate, using the second model 222, the ego motion information 230 using the feature data generated by the first model 221. The second model 222 may include a recurrent neural network or recurrent connections. For example, the second model 222 may include a bi-directional recurrent neural network as the recurrent neural network. As illustrated in FIG. 2, the second model 222 may include a layer connected to a layer corresponding to each time frame of the first model 221.

The input data 210 may be data having a structure in which radar sensing data 201 corresponding a plurality of time frames is stacked (e.g., each of the time frames is stacked and input into a same convolutional layer of the first model 221, or a plurality of the time frames are stacked but at least one of the time frames is excluded from the stack and is therefore excluded from being input with stacked time frames into the same convolutional layer of the first model 221). In the example of FIG. 2, the input data 210 is data in which the radar sensing data 201 corresponding to a frame t−1 (e.g., a previous frame), a frame t (e.g., a current frame), and a frame t+1 (e.g., a subsequent frame) is stacked, t being an integer greater than or equal to 1.

Although FIG. 2 illustrates the radar sensing data 201 as a scan image indicating a distance from a target point for each steering angle, the radar sensing data 201 is not limited thereto. The radar sensing data 201 may include all data sensed by a radar sensor for each time frame.

Based on a layer corresponding to each of the plurality of time frames in the first model 221, the ego motion estimation apparatus may extract, using the first model 221, feature data of the corresponding time frame from the input data 210 of the corresponding time frame. The ego motion estimation apparatus calculates, using the second model 222, the ego motion information 230 of the corresponding time frame from the extracted feature data. Also, the ego motion estimation apparatus inputs the radar sensing data 201 corresponding to at least two time frames with respect to a layer corresponding to one time frame in the motion recognition model 220. As illustrated in FIG. 2, the ego motion estimation apparatus may input the radar sensing data 201 corresponding to the frame t−1 and the radar sensing data 201 corresponding to the frame t to a same convolution layer corresponding to the frame t in the first model 221.

The ego motion estimation apparatus may estimate the ego motion information 230 of the plurality of time frames from the input data 210 of the plurality of time frames using the motion recognition model 220. When a plurality of items of radar sensing data corresponding to the plurality of time frames is stacked in the input data 210, the ego motion estimation apparatus obtains the ego motion information 230 for each of the plurality of time frames. In the example of FIG. 2, the input data 210 indicates the radar sensing data 201 associated with the frame t−1, the frame t, and the frame t+1. The ego motion estimation apparatus outputs, based on the input data 210, coordinates of the apparatus in the frame t−1, coordinates of the apparatus in the frame t, and coordinates of the apparatus in the frame t+1.

Although FIG. 2 illustrates three time frames for brevity of description, a number of frame used in the ego motion estimation apparatus is not limited thereto. For example, the ego motion estimation apparatus generates the input data 210 for M time frames. In this example, the input data 210 may be data in which the radar sensing data 201 corresponding to a frame t−M+1 through the frame t is stacked, M being an integer greater than or equal to 1. Also, although FIG. 2 illustrates that the radar sensing data 201 corresponding to the plurality of time frames is stacked in the input data 210, embodiments are not limited thereto. The input data 210 may include the radar sensing data 201 corresponding to one time frame.

A method of estimating an ego motion using a motion recognition model will be described as follows.

Figure 3:
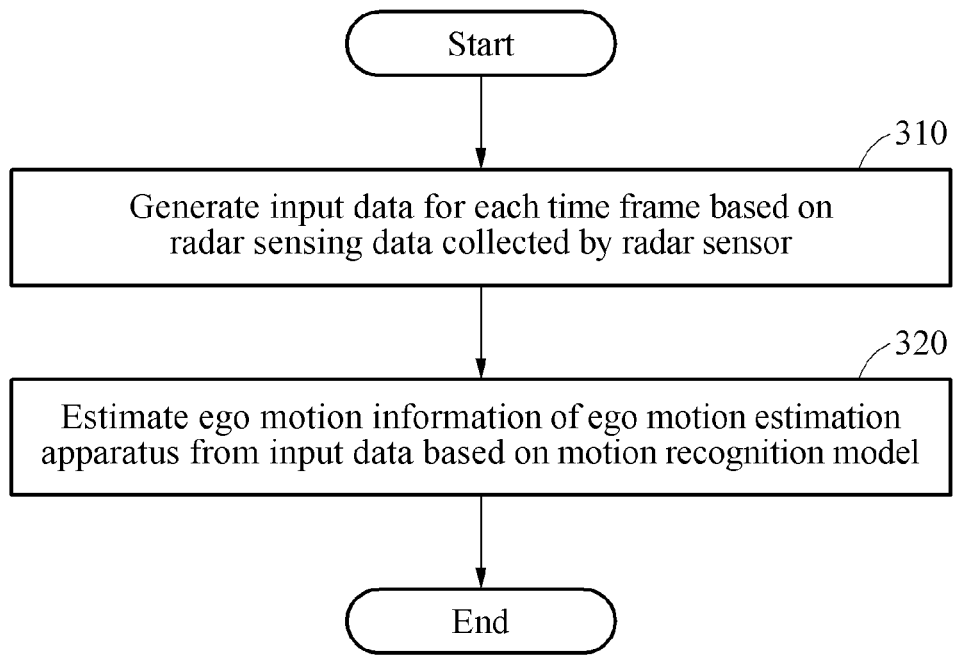
FIG. 3 illustrates an example of an ego motion estimation method.

FIG. 3 illustrates an example of an ego motion estimation method.

In operation 310, an ego motion estimation apparatus may generate input data for each time frame based on radar sensing data collected by a radar sensor. For example, a radar signal is detected by at least one radar sensor arranged along an outer face of the ego motion estimation apparatus. The radar signal may be a signal emitted by the radar sensor, reflected from a target point, and then sensed by the radar sensor. The ego motion estimation apparatus generates the radar sensing data by preprocessing the detected radar signal.

In operation 320, the ego motion estimation apparatus may estimate ego motion information of the ego motion estimation apparatus based on the input data using a motion recognition model. The ego motion estimation apparatus calculates at least one of a position and a pose of the ego motion estimation apparatus as at least a portion of the ego motion information.

Figure 4:
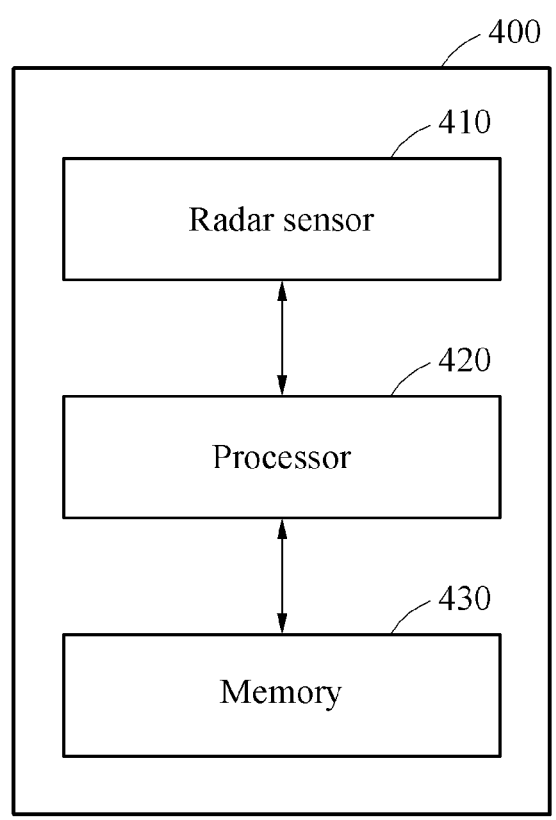
FIG. 4 illustrates an example of an ego motion estimation apparatus.

FIG. 4 illustrates an example of an ego motion estimation apparatus.

An ego motion estimation apparatus 400 may include a radar sensor 410, a processor 420, and a memory 430.

The radar sensor 410 may be a sensor that emits and receives a radar signal. For example, the radar sensor 410 generates radar sensing data by preprocessing the radar signal. For example, the radar sensor 410 generates the radar sensing data based on a difference in frequency between a signal emitted by the radar sensor 410 and a reflected signal.

The processor 420 may generate input data from the radar sensing data for each time frame, and the processor 420 may estimate ego motion information of the ego motion estimation apparatus 400 from the input data using a motion recognition model. Operations of the processor 420 will be further described with reference to FIGS. 5 through 15.

The memory 430 may store information required for performing the ego motion estimation method temporarily or permanently. For example, the memory 430 stores the motion recognition model and a trained parameter of the motion recognition model. Also, the memory 430 stores the radar sensing data and the input data.

Figure 5:
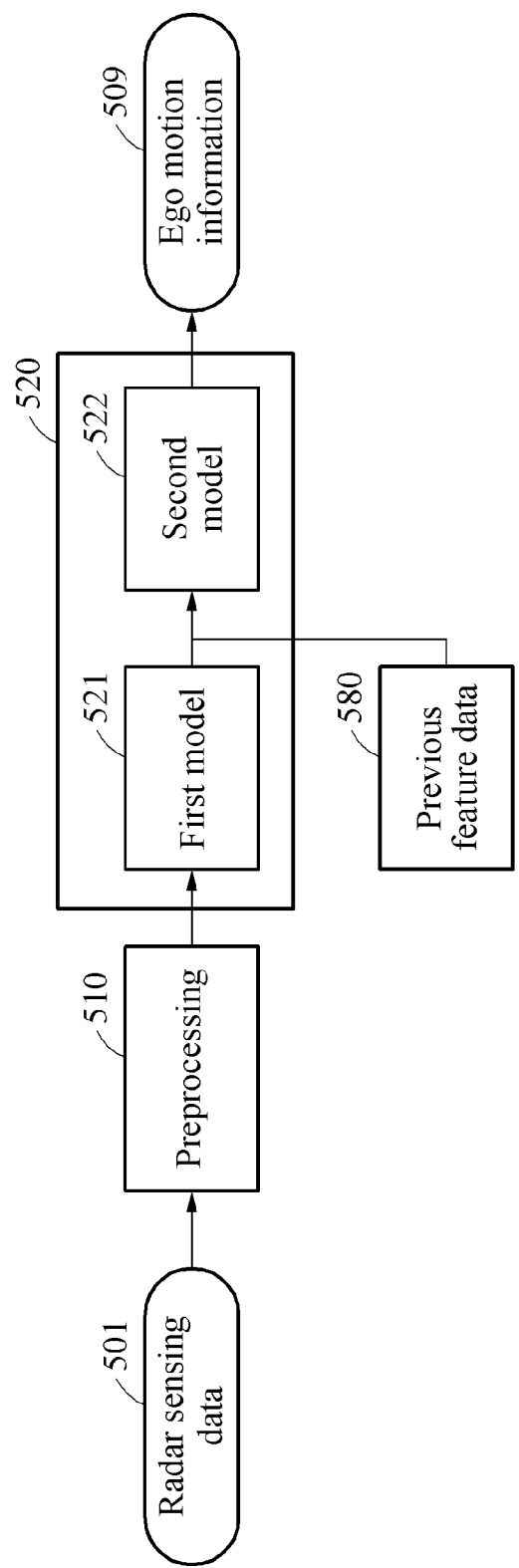
FIG. 5 illustrates an example of a process of an ego motion estimation.

FIG. 5 illustrates an example of a process of an ego motion estimation.

An ego motion estimation apparatus generates input data by performing preprocessing operation 510 on radar sensing data 501. The ego motion estimation apparatus estimates ego motion information 509 from the input data using a motion recognition model 520. However, the preprocessing operation 510 is not limited thereto. The ego motion estimation apparatus converts the radar sensing data 501 into the input data indicating distance, angle, and speed information through the preprocessing operation 510. The radar sensing data 501 may vary based on, for example, a required resolution and a modulation scheme of the radar sensor.

The ego motion estimation apparatus extracts current feature data from input data corresponding to a current frame based on a first model 521. The ego motion estimation apparatus loads previous feature data 580 corresponding to a previous frame from a memory. After the preprocessing, the radar sensing data 501 is expressed as 3D information, for example, a range, a steering angle, and a Doppler velocity, which may be similar to a structure of an image, for example, an X coordinate, a Y coordinate, and a channel. When extracting a feature of the image, a greater performance may be achieved by using a CNN and convolution layers thereof. The CNN may have a great performance in extracting information on a range and an angle axis which is positional information, and may also have a great performance for a Doppler velocity axis corresponding to a channel, for example, RGB of the image.

The ego motion estimation apparatus obtains the ego motion information 509 from the previous feature data 580 and the current feature data using a second model 522. The radar sensor consecutively acquires radar sensing data for each time frame. In this example, radar sensing data acquired for adjacent time frames may have similar temporal correlation. A model having a great performance in recognizing data having the temporal correlation may include a recurrent neural network and one or more corresponding recurrent layers.

Figure 6:
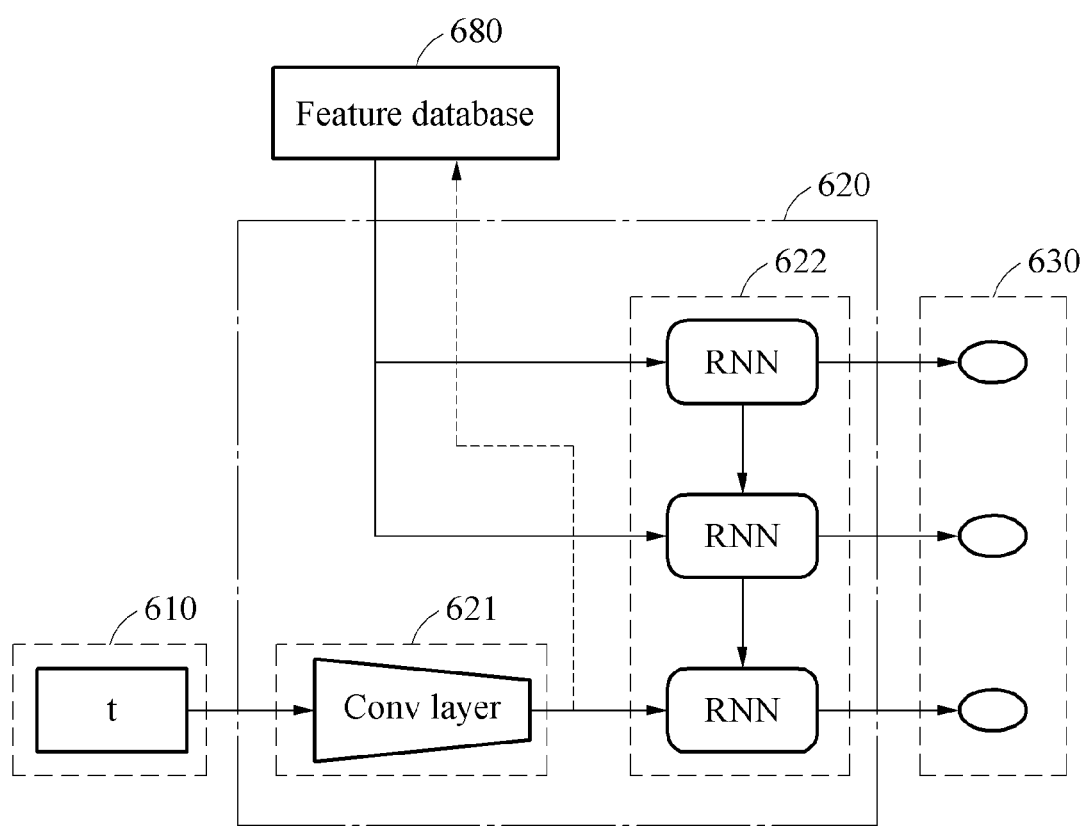
FIG. 6 illustrates an example of a structure of a motion recognition model.

FIG. 6 illustrates an example of a structure of a motion recognition apparatus.

When consecutive radar sensing data is continuously acquired, an ego motion estimation apparatus may skip preprocessing and feature data extraction for a previous time frame because the preprocessing and the feature data extraction for the previous time frame are overlapped. For example, the ego motion estimation apparatus stores feature data extracted from a CNN and performs the preprocessing and the feature data extraction for radar sensing data acquired for each time frame so as to be transmitted to a recurrent neural network together with previous feature data. For example, referring to FIG. 6, feature data corresponding to a previous frame t−1 may have been previously calculated by a first model 621 and stored in a feature database 680. Accordingly, a second model 622 may determine ego motion information 630 based on both (a) feature data corresponding to a current frame t, currently calculated by the first model 621, and (b) the feature data corresponding to the previous frame t−1, retrieved from the feature database 680.

The ego motion estimation apparatus may calculate feature data corresponding to a current frame from input data 610 corresponding to the current frame using a convolution layer corresponding to the current frame of a first model 621. The ego motion estimation apparatus stores, in a memory, the calculated feature data corresponding to the current frame based on the first model 621 included in a motion recognition model 620. The ego motion estimation apparatus adds the feature data corresponding to the current frame to a feature database 680 stored in the memory.

The ego motion estimation apparatus may estimate ego motion information 630 for a plurality of time frames based on the input data 610 (for example, the data corresponding to a frame t of FIG. 6) corresponding to a portion of the plurality of time frames. For example, the first model 621 may be implemented in a structure of outputting, using the input data 610 corresponding to one time frame, feature data of the corresponding time frame. A second model 622 may be implemented in a structure of outputting the ego motion information 630 corresponding to M frames from feature data corresponding to the M frames, M being "3" in the example of FIG. 6. The ego motion estimation apparatus extracts current feature data corresponding to the frame t from the input data 610 corresponding to the frame t using the first model 621, and loads previous feature data corresponding to a frame t−M+1 through a frame t−1. The ego motion estimation apparatus generates the ego motion information 630 corresponding to the frame t−M+1 through the frame t−1 from the feature data corresponding to the frame t−M+1 through the frame t−1 using the second model 622.

As such, instead of extracting the feature data corresponding to the M time frames using the first model 621 for each time frame, the ego motion estimation apparatus extracts the feature data corresponding to one time frame using the first model 621 (and the second model 622 retrieves the already-generated feature data corresponding to the M time frames from the feature database 680), thereby reducing computation resources and time required for feature data extraction.

Figure 7:
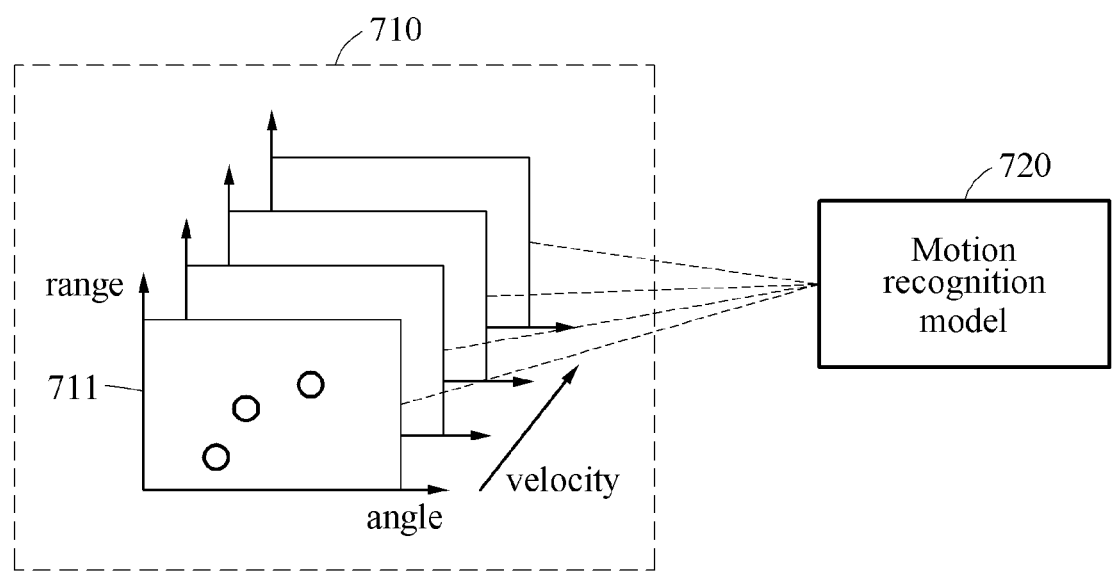
FIGS. 7 and 8 illustrate examples of generating input data.
Figure 8:
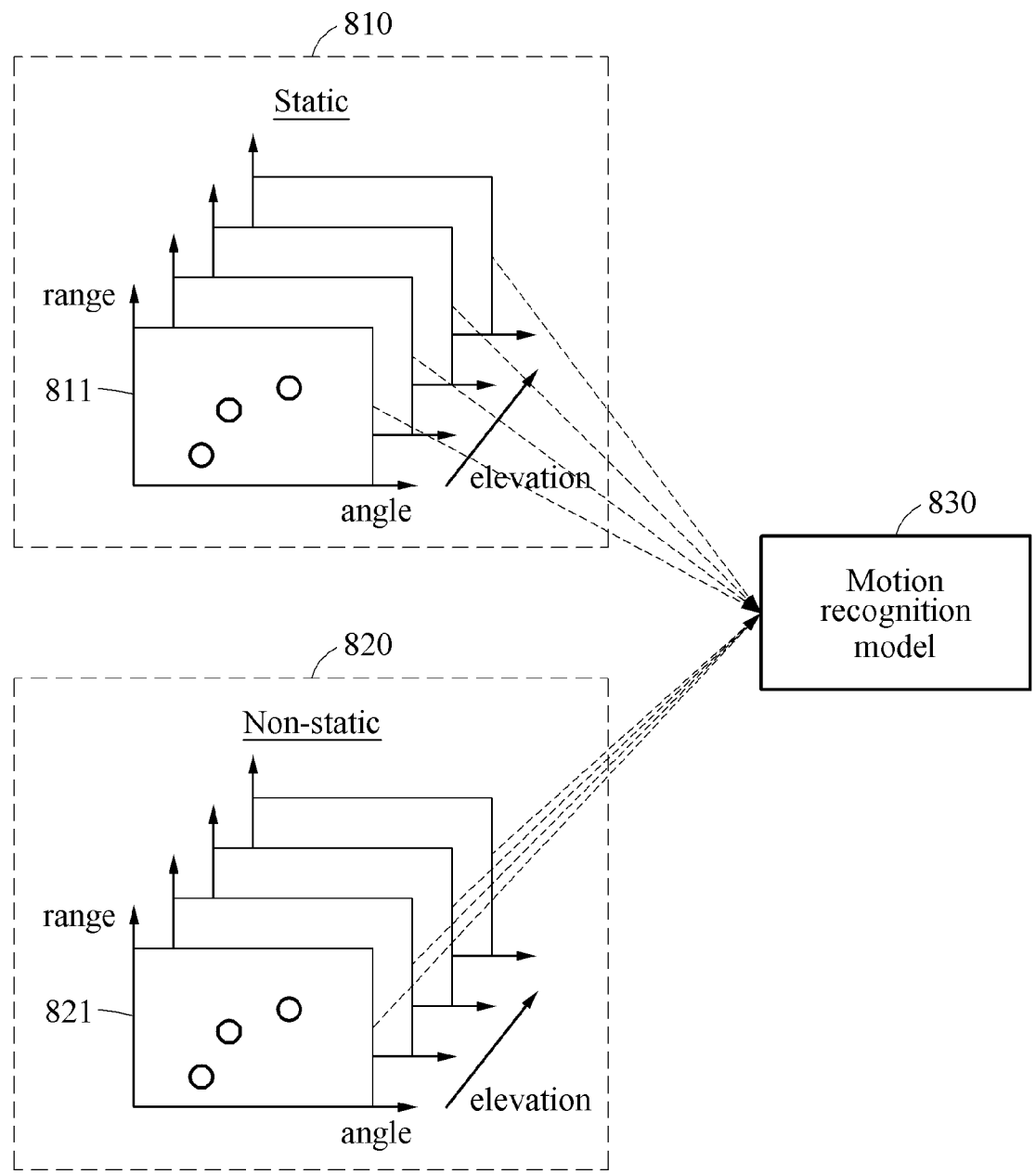

FIGS. 7 and 8 illustrate examples of generating input data.

An ego motion estimation apparatus may classify a distance (for example, a range from the apparatus to a target point and a map indicating a steering angle with respect to the target point) based on, for example, an elevation angle and a velocity at the target point. The ego motion estimation apparatus generates input data by converting and classifying data from a radar sensing model into a form suitable to be input in a motion recognition model.

The ego motion estimation apparatus generates radar sensing data indicating a range and an angle of a point detected by a radar sensor for each quantized velocity from a radar signal. The ego motion estimation apparatus uses the generated radar sensing data as input data 710. A velocity verified (e.g., determined) based on the radar sensing data is, for example, a velocity of the ego motion estimation apparatus relative to the target point. An angle verified based on the radar sensing data is, for example, a steering angle that is an angular difference between a travelling direction of the apparatus and a direction from the apparatus toward the target point. Although the present disclosure describes the steering angle as a horizontal angle on a 2 D plane sensed by the radar sensor, embodiments are not limited thereto. Steering of the radar sensor may be performed vertically and horizontally. When the steering is performed vertically, the steering angle may be an elevation angle.

For brevity of description, FIG. 7 illustrates the input data 710 generated for one time frame. The input data 710 generated for one time frame includes radar sensing data 711 indicating a range and an angle corresponding to a target point detected by the radar sensor for each quantized velocity. When radar sensing data corresponding to a plurality of time frames is stacked, the ego motion estimation apparatus generates, for each of the plurality of time frames, the input data 710 indicating the range and the angle corresponding to the target point for each quantized velocity. The ego motion estimation apparatus calculates ego motion information from the input data 710 using a motion recognition model 720.

The ego motion estimation apparatus generates input data indicating a range and a horizontal angle corresponding to a point detected by the radar sensor for each elevation angle, from the radar sensing data. The elevation angle may be an angle formed by the target point from a horizontal plane of the radar sensor with respect to a vertical direction based on the radar sensor.

Referring to FIG. 8, the ego motion estimation apparatus may classify radar sensing data into static data 810 associated with a static point and dynamic data 820 associated with a dynamic point. The static point may be a stationary object of the target point, and a point at which an absolute velocity is zero. The dynamic point may be a moving object of the target point, and a point at which an absolute velocity is not zero. The ego motion estimation apparatus generates static input data indicating a range and a horizontal angle of a point detected by the radar sensor for each quantized elevation, from the static data 810. The ego motion estimation apparatus generates static input data indicating a range and a horizontal angle of a point detected by the radar sensor for each quantized elevation, from the dynamic data 820. For brevity of description, FIG. 8 illustrates input data generated for one time frame. The input data generated for one time frame includes the static data 810 and the dynamic data 820. The static data 810 for a predetermined time frame includes data 811 indicating a range and a horizontal angle of a target point detected by the radar sensor for each quantized elevation. The dynamic data 820 for a predetermined time frame includes data 821 indicating a range and a horizontal angle of a target point detected by the radar sensor for each quantized elevation.

The ego motion estimation apparatus calculates the ego motion information from the input data including the static data 810 and the dynamic data 820 using a motion recognition model 830.

Figure 9:
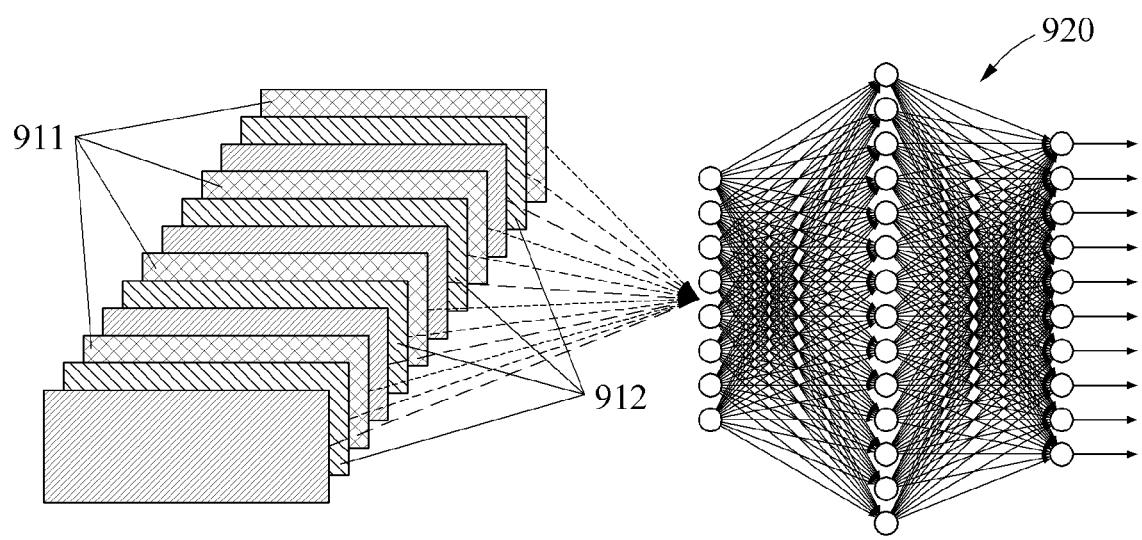
FIGS. 9 and 10 illustrate examples of input data generated using stacked radar sensing data.
Figure 10:
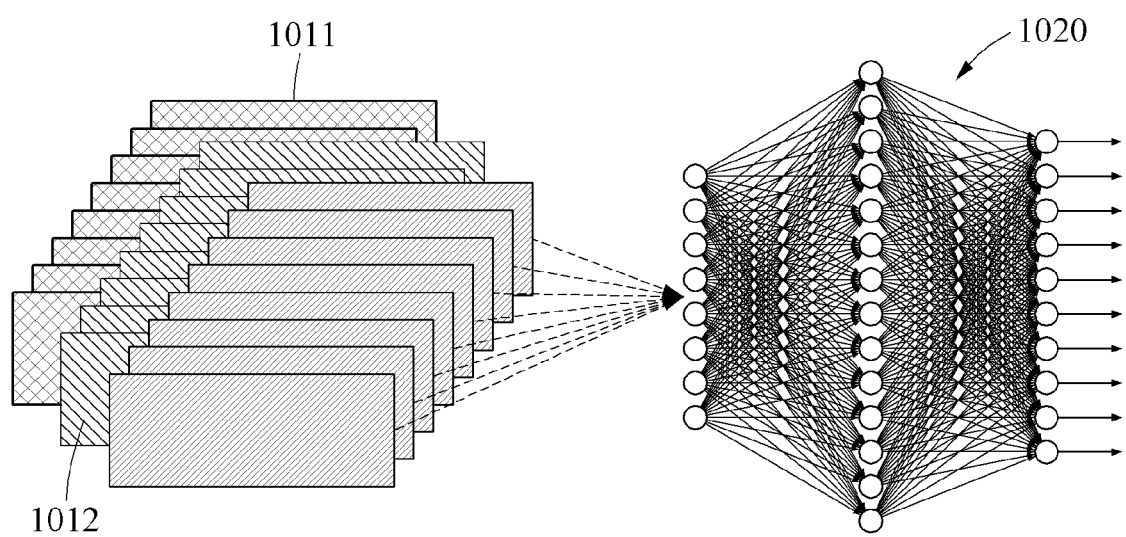

FIGS. 9 and 10 illustrate examples of input data generated using stacked radar sensing data.

Radar sensing data is ensembled (e.g., stacked) along a spatial axis.

FIG. 9 illustrates input data in which radar sensing data is stacked by skipping (e.g., alternating) a few of time frames. An ego motion estimation apparatus selects at least two radar sensing data of time frames differing by a preset time interval among a plurality of radar sensing data. In the example of FIG. 9, the preset time interval may be three frames. The ego motion estimation apparatus collects a first frame through a twelfth frame. The ego motion estimation apparatus selects radar sensing data 911 corresponding to a first frame, a fourth frame, a seventh frame, and a tenth frame. Thus, radar sensing data 911 is selected by, starting with the first frame, selecting every third frame and thereby skipping the frame in between. The ego motion estimation apparatus selects radar sensing data 912 corresponding to a second fame, a fifth frame, an eighth frame, and an eleventh frame. Thus, radar sensing data 912 is selected by, starting with the second frame, selecting every third frame and thereby skipping the frame in between.

The ego motion estimation apparatus generates input data based on the selected radar sensing data. In the tenth frame, for example, the ego motion estimation apparatus inputs, to a motion recognition model 920, input data generated from the radar sensing data 911 corresponding to the first frame, the fourth frame, the seventh frame, and the tenth frame. The ego motion estimation apparatus calculates ego motion information corresponding to the first frame, the fourth frame, the seventh frame, and the tenth frame from the radar sensing data 911 using the motion recognition model 920. In the eleventh frame, for example, the ego motion estimation apparatus inputs, to the motion recognition model 920, input data generated from the radar sensing data 912 corresponding to the second fame, the fifth frame, the eighth frame, and the eleventh frame. The ego motion estimation apparatus calculates ego motion information corresponding to the second fame, the fifth frame, the eighth frame, and the eleventh frame from the radar sensing data 912 using the motion recognition model 920. Such order of the aforementioned time frames is described as an example, and an order of time frames is not limited to the example.

FIG. 10 illustrates input data generated to correspond to a predetermined length of time for each time frame. In response to radar sensing data corresponding to a subsequent frame being received, an ego motion estimation apparatus excludes radar sensing data (or input data) corresponding to a first frame of a plurality of time frames stacked in input data.

Referring to FIG. 10, the ego motion estimation apparatus collects radar sensing data corresponding to a first frame through an eighth frame. The ego motion estimation apparatus generates input data 1011 corresponding to the eighth frame by stacking the radar sensing data corresponding to the first frame through the eighth frame. In a ninth frame, the ego motion estimation apparatus excludes the radar sensing data (or the portion of the input data 1011) corresponding to the first frame. The ego motion estimation apparatus generates input data 1012 corresponding to the ninth frame by stacking the radar sensing data corresponding to a second frame through the ninth frame. Accordingly, for a given frame, input data is generated based on eight frames (the given frame and the seven previous frames, excluding the eighth previous frame). The ego motion estimation apparatus calculates ego motion information corresponding to the first frame through the eighth frame from the input data 1011 corresponding to the first frame through the eighth frame based on a motion recognition model 1020. The ego motion estimation apparatus calculates ego motion information corresponding to the second frame through the ninth frame from the input data 1012 corresponding to a second frame through the ninth frame based on the motion recognition model 1020.

Figure 11:
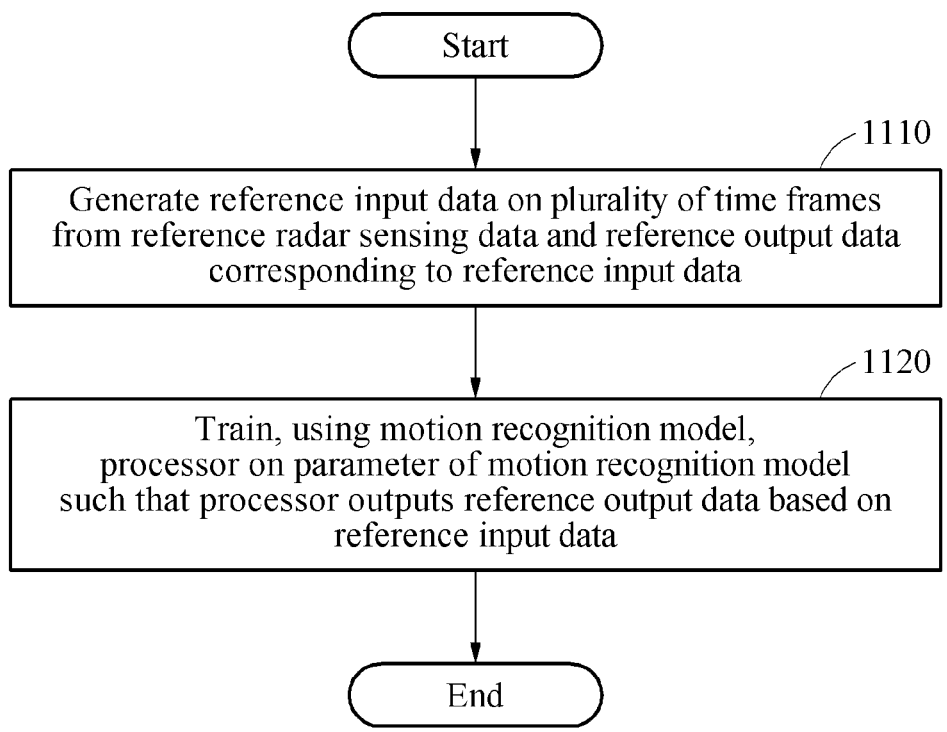
FIGS. 11 and 12 illustrate examples of a model training method.
Figure 12:
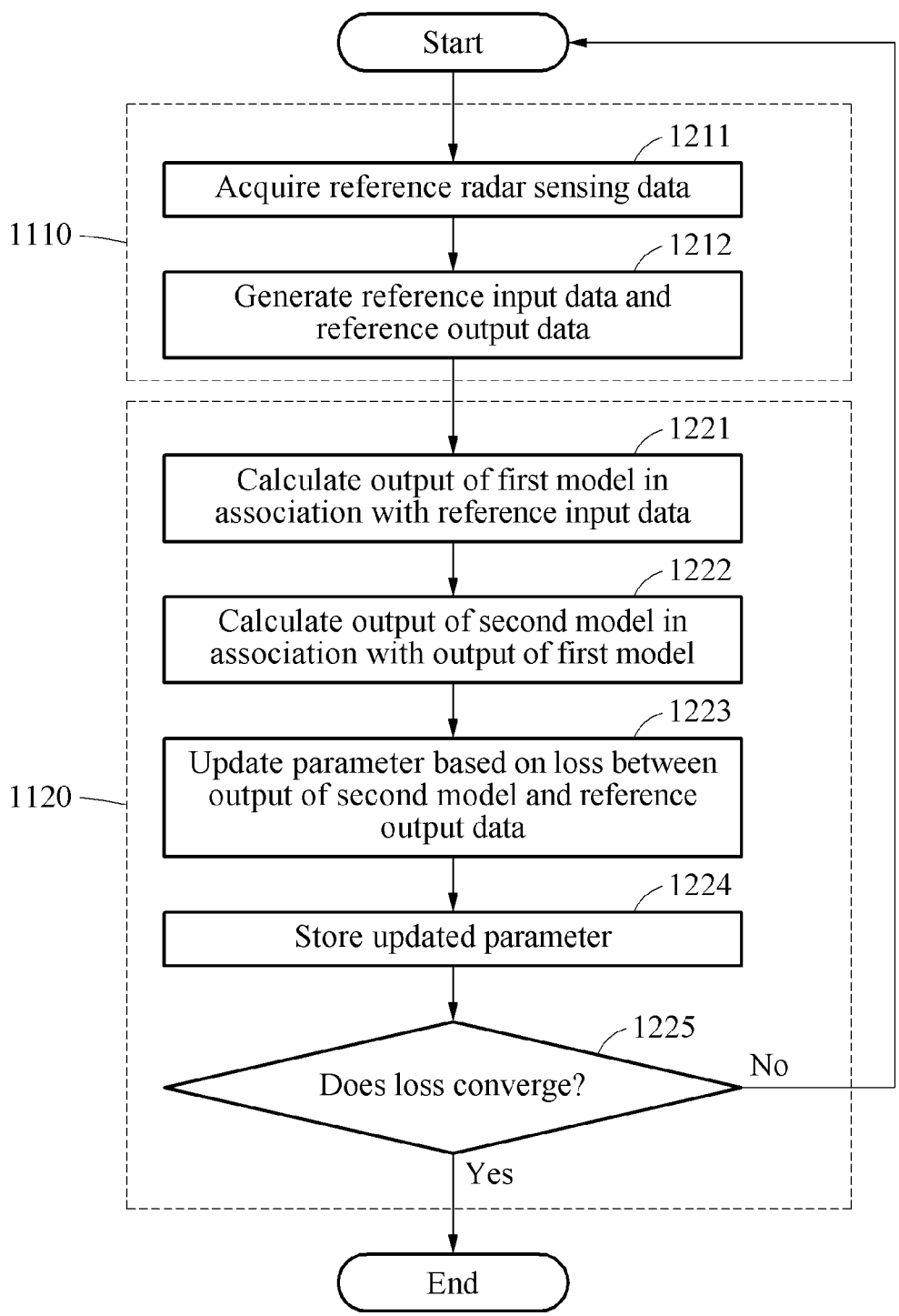

FIGS. 11 and 12 illustrate examples of a model training method.

FIG. 11 illustrates a flow of training.

In operation 1110, a model training apparatus may generate reference input data on a plurality of time frames from reference radar sensing data and reference output data corresponding to the reference input data. The reference sensing data corresponds to a training input, and the reference output data corresponds to a training output. Training data includes, for example, a pair of the reference radar sensing data and the reference output data. The reference output data may also be referred to as reference ego motion information.

In operation 1120, the model training apparatus may train, using a motion recognition model, a processor on a parameter of the motion recognition model such that the processor outputs the reference output data based on the reference input data. The model training apparatus updates the parameter of the motion recognition model based on the motion recognition model until a loss between an output (e.g., a temporary output) calculated from the reference input data and the reference output data is less than a threshold loss.

Another training will be described with reference to FIG. 12.

In operation 1211, a model training apparatus acquires reference radar sensing data. The model training apparatus acquires the reference radar sensing data from a training database.

In operation 1212, the model training apparatus generates reference input data and reference output data. The model training apparatus generates the reference input data from the reference radar sensing data through an operation (e.g., through the operations described with reference to FIGS. 7 through 10, the examples are not limited thereto). The model training apparatus acquires the reference output data from the training database.

In operation 1221, the model training apparatus calculates an output of a first model in association with the reference input data. As described with reference to FIG. 1, for example, the model training apparatus calculates feature data (e.g., temporary feature data) by inputting the reference input data to the first model and propagating the reference input data to layers.

In operation 1222, the model training apparatus calculates an output of a second model in association with the output of the first model. As described with reference to FIG. 1, the model training apparatus calculates an output (e.g., a temporary output) by inputting feature data to the second model and propagating the feature data.

In operation 1223, the model training apparatus updates a parameter based on a loss between the output of the second model and the reference output data. The model training apparatus calculates a value of an objective function between the output (e.g., the temporary output) calculated based on the second model and the reference output data as the loss. The objective function may be, for example, an mean square error (MSE), an absolute error, and a Huber loss. The objective function may be combined with a regularization term of a parameter so as to be used. The model training apparatus adjusts a parameter of a motion recognition model to reduce the loss. The parameter of the motion recognition model may be, but not be limited to, a connection weight in a case in which the motion recognition model is a neural network.

In operation 1224, the model training apparatus stores the updated parameter. The model training apparatus stores the updated parameter in a memory. The model training apparatus uploads the updated parameter in a server or transmits the updated parameter to the ego motion estimation apparatus. The parameter uploaded in the server may be transferred to the ego motion estimation apparatus through a communication network or a data interface.

In operation 1225, the model training apparatus determines whether the loss converges. The model training apparatus determines whether the calculated loss is less than a threshold loss. In response to the loss having converged, the model training apparatus terminates the training. In response to the loss having not converged, the model training apparatus repetitively performs operations 1211 through 1225, e.g., until it is determined in operation 1225 that the loss has converged.

Figure 13:
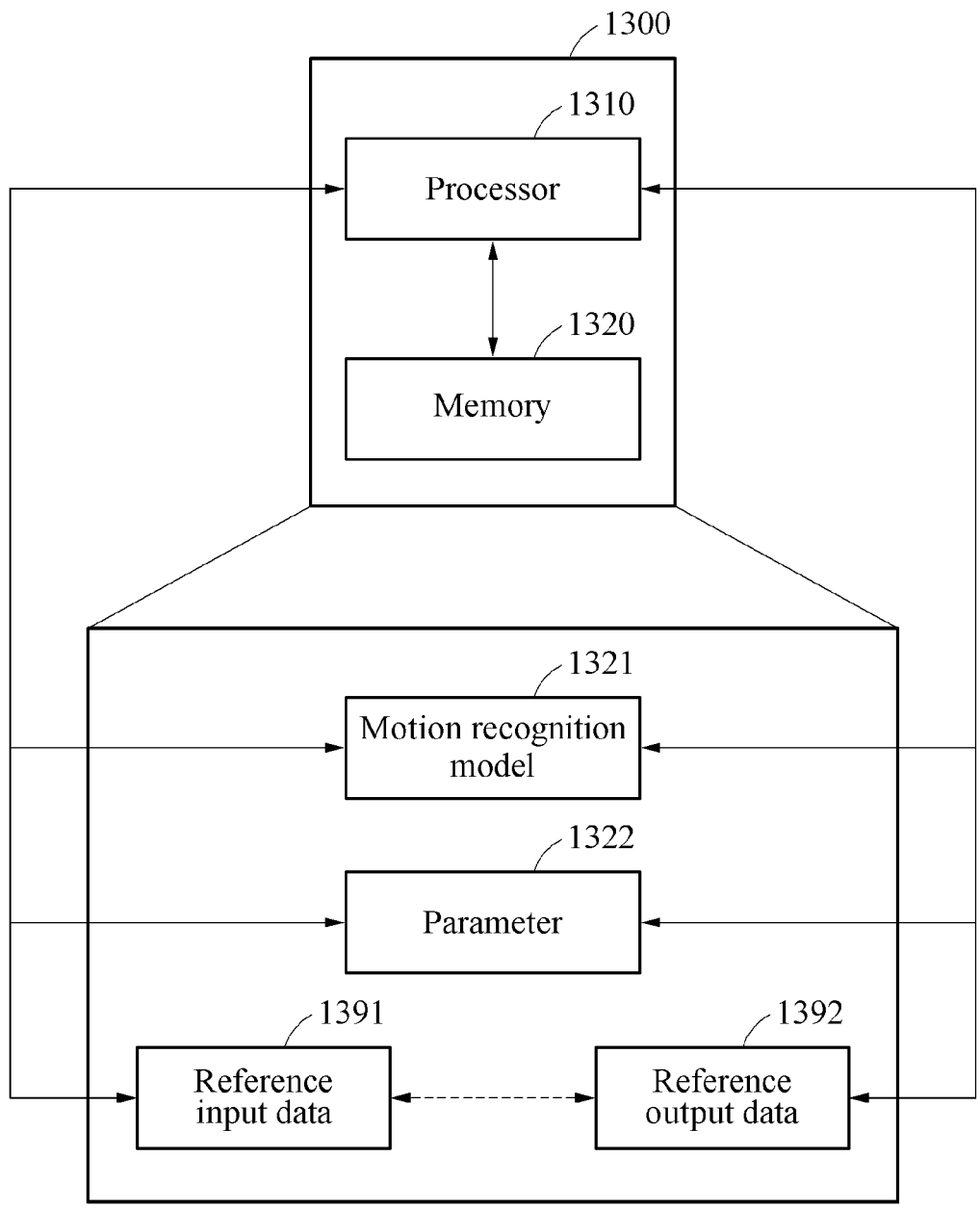
FIG. 13 illustrate an example of a model training apparatus.

FIG. 13 illustrate an example of a model training apparatus.

A model training apparatus 1300 includes a processor 1310 and a memory 1320.

The processor 1310 generates reference input data 1391 on a plurality of time frames from reference radar sensing data and reference output data 1392 corresponding to the reference input data 1391. The processor 1310 trains, based on a motion recognition model 1321, the processor 1310 on a parameter 1322 of the motion recognition model 1321 such that the processor 1310 outputs the reference output data 1392 based on the reference input data 1391. An operation of the processor 1310 is not limited thereto, but may be performed in combination with the operations described with reference to FIGS. 11 and 12.

The memory 1320 temporarily or permanently stores information required for model training. The memory 1320 stores the motion recognition model 1321, the parameter 1322, and training data. The memory 1320 stores the reference input data 1391 and the reference output data 1392 as the training data. The reference output data 1392 may be a value given for the reference input data 1391, and may be ego motion information to be output in association with the reference input data 1391. Also, the memory 1320 stores reference sensing data instead of the reference input data 1391.

The model training apparatus 1300 may be implemented separate from the ego motion estimation apparatus but not be limited thereto. The model training apparatus 1300 and the ego motion estimation apparatus may also be implemented as a single apparatus.

Figure 14:
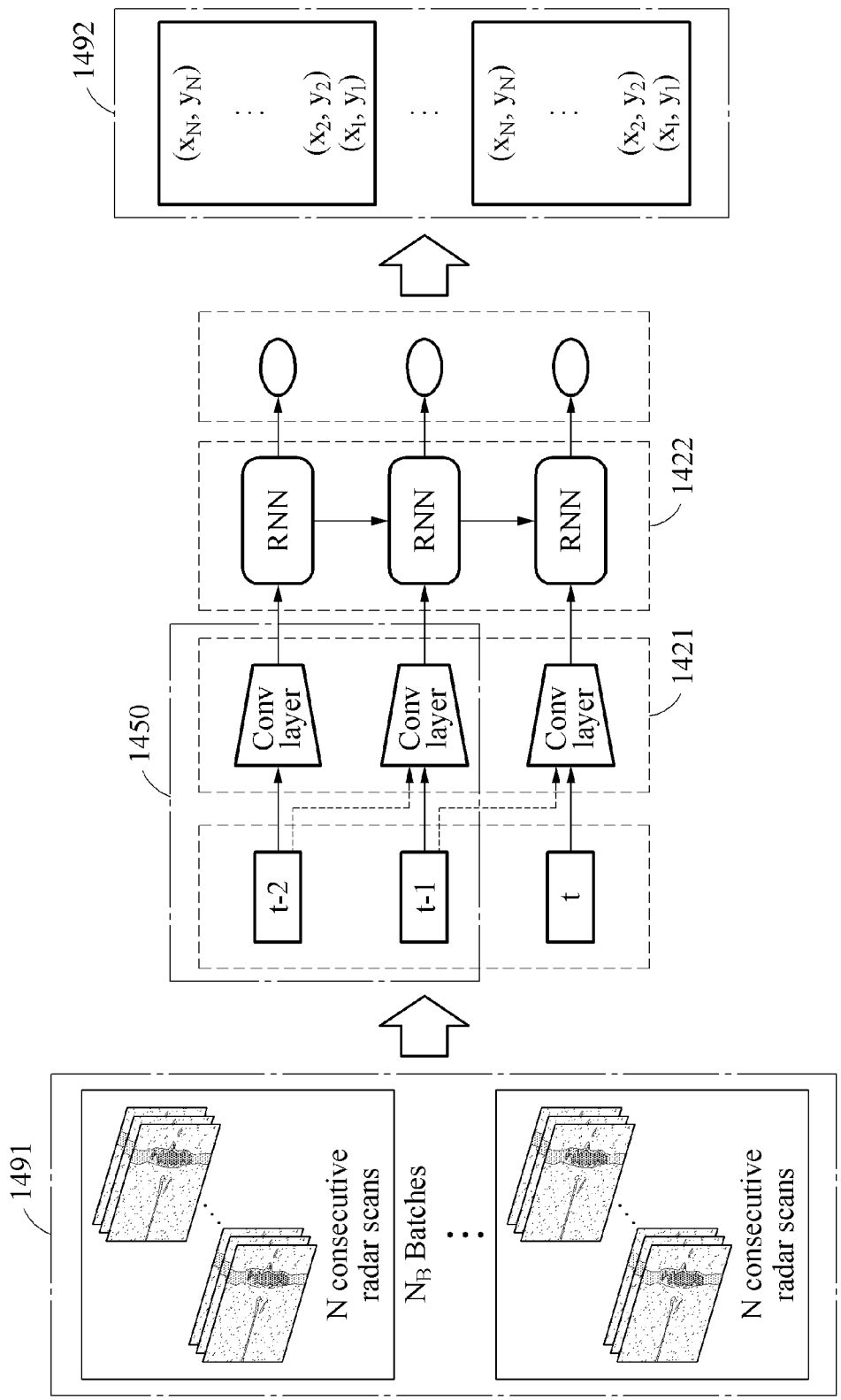
FIG. 14 illustrates an example of a model training process.

FIG. 14 illustrates an example of a model training process.

A model training apparatus trains a motion recognition model to output reference ego motion information 1492 from reference radar sensing data 1491. The model training apparatus uses N items of consecutive radar data on which preprocessing is completed. To perform the training, the model training apparatus uses $N_B$ items of mini-batch radar data among the consecutive radar data as an input. The motion recognition model includes a CNN and a recurrent neural network. Ego motion information output by the motion recognition model includes estimated values of a position and a pose of the apparatus. As illustrated in FIG. 14, the ego motion information includes, for example, N sets of x and y coordinates for each time frame.

The model training apparatus acquires a radar signal as raw data and generates the reference radar sensing data 1491 through a basic radar signal processing (RSP) preprocessing. The model training apparatus generates reference input data by temporally accumulating the reference radar sensing data 1491.

To perform the training, the model training apparatus calculates feature data (e.g., temporary feature data) based on a first model 1421 for each time frame. In the example of FIG. 14, the model training apparatus calculates feature data (e.g., temporary feature data) for each of a frame t−2, a frame t−1, and a frame t. The model training apparatus calculates an output (e.g., a temporary output) based on a second model 1422 for each time frame.

The model training apparatus calculates an error value, for example, a loss by comparing the output (e.g., the temporary output) to a ground truth, for example, the reference ego motion information 1492. The model training apparatus uses a loss function such as an MSE.

The model training apparatus propagates the calculated error value to lower layers based on a back-propagation through time (BPTT) scheme and updates a parameter between layers of the motion recognition model.

The model training apparatus generates a localized motion recognition model by storing state values and a weight of the first model 1421 and the second model 1422 for each training. When the error value converges, the model training apparatus terminates the training and otherwise performs re-training.

When the model training apparatus performs the training, the first model 1421 includes a layer 1450 of a previous frame. When the first model 1421 is used for ego motion estimation, the layer 1450 of the previous frame is removed. The model training apparatus uses a plurality of training data for the training, thereby increasing a training speed. Also, the ego motion estimation apparatus uses radar sensing data corresponding to a current frame, thereby improving an operation speed of the ego motion estimation.

Figure 15:
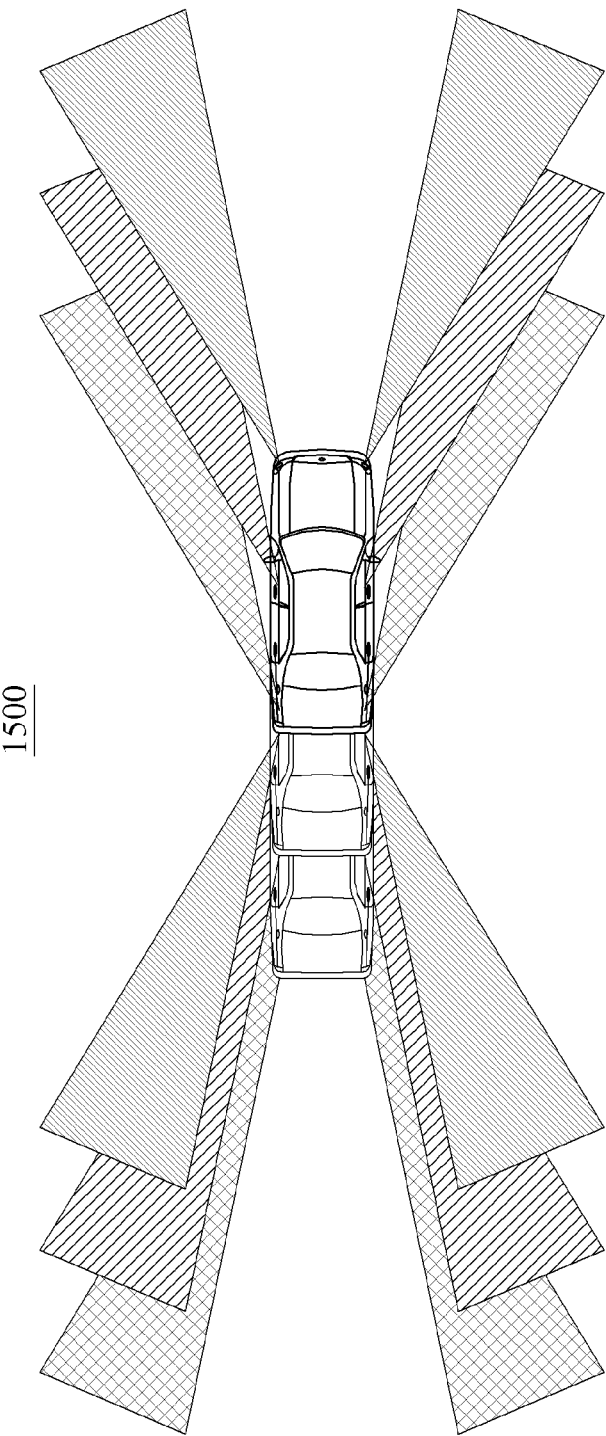
FIG. 15 illustrates an example of an ego motion estimation apparatus using a plurality of radar sensors.

FIG. 15 illustrates an example of an ego motion estimation apparatus using a plurality of radar sensors.

Referring to FIG. 15, an ego motion estimation apparatus 1500 may be, or included in, a vehicle, as a non-limiting example. The ego motion estimation apparatus 1500 estimates a pose and a moving path of the vehicle by localizing radar sensors in the vehicle. The ego motion estimation apparatus 1500 detects an object in a vicinity of the ego motion estimation apparatus 1500 based on estimated ego motion information. The ego motion estimation apparatus 1500 assists autonomous driving and various advanced driver assistance systems (ADAS) functions of the vehicle. The ego motion estimation apparatus 1500 acquires a high resolution image of a wide range based on its own positional information accurately measured for each time frame.

As illustrated in FIG. 15, when the ego motion estimation apparatus 1500 includes a plurality of radar sensors, the ego motion estimation apparatus 1500 localizes each of the radar sensors and fuses the localized results, thereby increasing an accuracy of ego motion information estimation. The ego motion estimation apparatus 1500 may combine a radar sensor with another sensor, for example, a camera sensor, an ultrasonic sensor, and light detection and ranging (LiDAR) or fuses ego motion information and information such as a global navigation satellite system (GNSS), a vehicle speed, and a steering angle, thereby improving the accuracy. As illustrated in FIG. 15, when omnidirectional radar sensing data is acquired, the ego motion estimation apparatus 1500 generates a 360-degree image around the vehicle or recognizes an ambient environment of the vehicle.

The ego motion estimation apparatus 1500 may maintain the accuracy without special actions such as loop closing irrespective of a lapse of time. Also, the ego motion estimation apparatus 1500 may maintain the accuracy even when a moving object is in a captured scene.

The ego motion estimation apparatuses, processors, memories, ego motion estimation apparatus 400, radar sensor 410, processor 420, memory 430, motion recognition apparatus, database 680, model training apparatus 1300, processor 1310, memory 1320, and ego motion estimation apparatus 1500, as well as the remaining apparatuses, units, modules, devices, and other components described herein with respect to FIGS. 1 through 15 are hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1 through 15 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented ego motion estimation method of an electronic apparatus, the method comprising:
generating input data based on radar sensing data, collected by one or more radar sensors, for each of a plurality of time frames;
for each of the plurality of time frames, estimating ego motion information of the time frame by executing, using the input data of the time frame and the input data of a previous frame of the plurality of time frames as inputs to a machine learning motion recognition model, the machine learning motion recognition model generating extracted feature data of the time frame, and generating estimated respective ego motion information of the time frame dependent on the extracted feature data of the time frame; and
recognizing a motion of an object, exterior of the electronic apparatus, based on the estimated respective ego motion information of the plurality of time frames,
wherein, for each of the plurality of time frames, the estimated respective ego motion information of the time frame includes information of a position and/or pose of the apparatus relative to the object.

2. The method of claim 1, wherein, for each of the plurality of time frames, the estimating of the ego motion information comprises:
performing the extracting of the feature data using a first model of the machine learning motion recognition model; and
performing the generating of the estimated respective ego motion information using a second model of the machine learning motion recognition model.

3. The method of claim 1, wherein the estimating of the ego motion information comprises executing the machine learning motion recognition model using radar sensing data corresponding to at least two time frames input to a layer of the machine learning motion recognition model,
wherein the at least two time frames comprises the time frame and the previous frame, and
wherein the radar sensing data comprises the extracted feature data of the time frame.

4. The method of claim 1, wherein, for each of the plurality of time frames, the estimating of the ego motion information comprises:
performing the generating of the extracted feature data by extracting the feature data of the time frame from the input data of the time frame and the input data of the previous frame of the time frames, using a first model of the machine learning motion recognition model; and
performing the generating of the estimated respective ego motion information of the time frame based on the extracted feature data of the time frame, using a second model of the machine learning motion recognition model.

5. The method of claim 4, wherein the estimating of the ego motion information comprises:

extracting subsequent feature data from input data of a subsequent frame of the time frames and the time frame, using the first model; and
determining subsequent ego motion information based on the subsequent feature data, using the second model.

6. The method of claim 5, wherein the extracting of the subsequent feature data comprises excluding the input data of the previous frame from the extracting of the subsequent feature data.

7. The method of claim 4, wherein the first model comprises a convolutional neural network and the second model comprises a recurrent neural network.

8. The method of claim 1,
wherein the machine learning motion recognition model comprises:
a first model including layers, wherein each of the layers corresponds to a respective one of the plurality of time frames; and
a second model connected to the layers of the first model, and
wherein, for each of the plurality of time frames, the estimating of the ego motion information comprises:
performing the generating of the extracted feature information by extracting, using a layer of the layers in the first model corresponding to a time frame of the plurality of time frames, the feature data of the time frame from the input data of the time frame; and
performing the generating of the estimated respective ego motion information of the time frame based on the extracted feature data of the time frame using the second model.

9. The method of claim 1, wherein, for each of the plurality of time frames, the estimating of the ego motion information comprises:
performing the generating of the extracted feature information by extracting the feature data of the time frame from the input data of the time frame using a first model of the machine learning motion recognition model;
loading previous feature data corresponding to the previous frame from a memory; and
performing the generating of the estimated respective ego motion information based on the previous feature data and the feature data of the time frame using a second model of the machine learning motion recognition model.

10. The method of claim 1, further comprising:
for each of the plurality of time frames, storing, in a memory, the extracted feature data of the time frame that was generated, for the time frame, by a first model included in the machine learning motion recognition model.

11. The method of claim 1, wherein the generating of the input data comprises:
detecting a radar signal using one or more radar sensors arranged along an outer face of the electronic apparatus or another apparatus that comprises the electronic apparatus;
generating the radar sensing data by preprocessing the detected radar signal; and
generating the input data based on the preprocessed radar signal.

12. The method of claim 1, wherein the generating of the input data comprises:
selecting two or more items of the radar sensing data corresponding to time frames of the time frames differing from each other by a preset time interval; and generating the input data based on the selected items of radar sensor data.

13. The method of claim 1, wherein the generating of the input data comprises:
excluding radar sensing data corresponding to a first frame of the plurality of time frames stacked in the input data, in response to radar sensing data corresponding to a subsequent frame being received.

14. The method of claim 1, wherein the generating of the input data comprises:
generating radar sensing data indicating an angle and a distance from a point detected by the one or more radar sensors for each quantized velocity from a radar signal.

15. The method of claim 1, wherein the generating of the input data comprises:
generating input data indicating a horizontal angle and a distance from a point detected by the one or more radar sensors for each quantized elevation angle from the radar sensing data.

16. The method of claim 1, wherein the generating of the input data comprises:
classifying the radar sensing data into static data of a static point detected by the one or more radar sensors and dynamic data of a dynamic point detected by the one or more radar sensors;
generating static input data indicating a horizontal angle and a distance from the static point for each quantized elevation angle based on the static data; and
generating dynamic input data indicating a horizontal angle and a distance from the dynamic point for each quantized elevation angle based on the dynamic data.

17. The method of claim 1, wherein the machine learning motion recognition model includes a convolutional neural network and a recurrent neural network (RNN).

18. The method of claim 17, wherein the RNN is a bi-directional neural network.

19. The method of claim 1, wherein the estimating of the ego motion information comprises:
in response to a plurality of items of radar sensing data corresponding to a plurality of time frames being stacked in the input data, performing the generating of the estimated respective ego motion information for each of the plurality of time frames.

20. The method of claim 1, further comprising:
generating reference input data for a plurality of training time frames based on reference radar sensing data and based on reference output data corresponding to the reference input data; and
generating the machine learning motion recognition model by training parameters of a model to output the reference output data based on the reference input data through a back-propagation training process.

21. A non-transitory computer-readable storage medium storing instructions that, when executed by one or more processors, cause the one or more processors to perform the method of claim 1.

22. An electronic apparatus comprising:
one or more radar sensors for collecting radar sensing data; and
one or more processors configured to execute instructions; and
one or more memories storing the instructions, which when executed by the one or more processors configures the one or more processors to:
generate input data based on the radar sensing data for each of a plurality of time frames of the radar sensing data;
for each of the plurality of time frames estimate ego motion information of the time frame through execution, using the input data of the time frame and the input data of a previous frame of the plurality of time frames as inputs to a machine learning motion recognition model, of the machine learning motion recognition model to generate extracted feature data of the time frame, and generate estimated respective ego motion information of the time frame dependent on the extracted feature data of the time frame; and
recognize a motion of an object, exterior of the electronic apparatus, based on the estimated respective ego motion information of the plurality of time frames,
wherein, for each of the plurality of time frames, the estimated respective ego motion information of the time frame includes information of a position and/or pose of the apparatus relative to the object.

23. The method of claim 1, further comprising performing autonomous driving or driver assistance operations of a vehicle, as the electronic apparatus that further includes the one or more radar sensors, relative to the object based on the estimated respective ego motion information of the plurality of time frames.

24. The method of claim 1, further comprising generating a moving path using the information of the position and/or pose of the apparatus of each of the estimated respective ego motion information of the plurality of time frames.

25. The method of claim 1, further comprising generating an image with the object using the information of the position and/or pose of the apparatus of each of the estimated respective ego motion information of the plurality of time frames.

* * * * *